United States Patent
Kim et al.

(10) Patent No.: US 9,886,384 B2
(45) Date of Patent: Feb. 6, 2018

(54) CACHE CONTROL DEVICE FOR PREFETCHING USING PATTERN ANALYSIS PROCESSOR AND PREFETCH INSTRUCTION AND PREFETCHING METHOD USING CACHE CONTROL DEVICE

(71) Applicant: SAMSUNG ELECTRONICS CO., LTD., Suwon-si (KR)

(72) Inventors: Jun-Kyoung Kim, Suwon-si (KR); Dong-Hoon Yoo, Seongnam-si (KR); Jeong-Wook Kim, Seoul (KR); Soo-Jung Ryu, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 24 days.

(21) Appl. No.: 14/931,019

(22) Filed: Nov. 3, 2015

(65) Prior Publication Data
US 2016/0055089 A1 Feb. 25, 2016

Related U.S. Application Data

(63) Continuation of application No. PCT/KR2014/003955, filed on May 2, 2014.

(30) Foreign Application Priority Data

May 3, 2013 (KR) .......................... 10-2013-0050250

(51) Int. Cl.
*G06F 12/00* (2006.01)
*G06F 12/0862* (2016.01)
(Continued)

(52) U.S. Cl.
CPC .......... *G06F 12/0862* (2013.01); *G06F 9/383* (2013.01); *G06F 12/0875* (2013.01);
(Continued)

(58) Field of Classification Search
CPC .. G06F 12/0862; G06F 9/383; G06F 12/0875; G06F 9/30; G06F 2212/452;
(Continued)

(56) References Cited

U.S. PATENT DOCUMENTS

| | | | |
|---|---|---|---|
| 8,082,398 B2 | 12/2011 | Yamada et al. | |
| 2005/0198439 A1* | 9/2005 | Lange | G06F 12/0862 711/137 |

(Continued)

FOREIGN PATENT DOCUMENTS

| | | |
|---|---|---|
| JP | 2009-251998 A | 10/2009 |
| KR | 10-2004-0038548 A | 5/2004 |

(Continued)

OTHER PUBLICATIONS

Chen, Tien-Fu. "An effective programmable prefetch engine for on-chip caches." *Proceedings of the 28th annual international symposium on Microarchitecture*. IEEE Computer Society Press, 1995. (6 pages, in English).

(Continued)

*Primary Examiner* — Hong Kim
(74) *Attorney, Agent, or Firm* — NSIP Law (57) ABSTRACT

The present examples relate to prefetching, and to a cache control device for prefetching and a prefetching method using the cache control device, wherein the cache control device analyzes a memory access pattern of program code, inserts, into the program code, a prefetching command generated by encoding the analyzed access pattern, and executes the prefetching command inserted into the program code in order to prefetch data into a cache, thereby maximizing prefetching efficiency.

17 Claims, 8 Drawing Sheets

(51) Int. Cl.
*G06F 12/0875* (2016.01)
*G06F 9/38* (2006.01)
*G06F 9/45* (2006.01)

(52) U.S. Cl.
CPC ...... *G06F 8/4442* (2013.01); *G06F 2212/452* (2013.01); *G06F 2212/6026* (2013.01); *G06F 2212/6028* (2013.01)

(58) Field of Classification Search
CPC ..... G06F 2212/6026; G06F 2212/6028; G06F 9/3802; G06F 2212/6022; G06F 2212/6024; G06F 8/444
USPC .......................... 712/207, 237; 711/213, 137
See application file for complete search history.

(56) References Cited

U.S. PATENT DOCUMENTS

| | | | |
|---|---|---|---|
| 2005/0262307 A1 | 11/2005 | Chiang et al. | |
| 2007/0005905 A1* | 1/2007 | Yasue | G06F 9/3832 711/137 |
| 2007/0101100 A1* | 5/2007 | Al Sukhni | G06F 9/3832 712/207 |
| 2007/0288697 A1 | 12/2007 | Keltcher | |
| 2008/0127131 A1* | 5/2008 | Gao | G06F 8/4442 717/140 |
| 2008/0256304 A1* | 10/2008 | Kezuka | G06F 3/061 711/145 |
| 2009/0287903 A1 | 11/2009 | Hsu et al. | |
| 2010/0095271 A1 | 4/2010 | Archambault et al. | |
| 2010/0211940 A1 | 8/2010 | Shih-wei Liao et al. | |
| 2010/0268892 A1 | 10/2010 | Luttrell | |
| 2010/0268893 A1 | 10/2010 | Luttrell | |
| 2011/0010506 A1 | 1/2011 | Greer et al. | |
| 2012/0036316 A1* | 2/2012 | Dowling | G06F 9/30032 711/105 |
| 2012/0317364 A1* | 12/2012 | Loh | G06F 12/0862 711/137 |
| 2013/0238861 A1* | 9/2013 | Manne | G06F 12/0862 711/137 |
| 2014/0108740 A1* | 4/2014 | Rafacz | G06F 12/0862 711/137 |
| 2014/0108741 A1* | 4/2014 | Boettiger | G06F 12/0862 711/137 |
| 2014/0189249 A1* | 7/2014 | Ye | G06F 12/0862 711/137 |
| 2014/0258622 A1* | 9/2014 | Lacourba | G06F 12/0862 711/122 |
| 2014/0281232 A1* | 9/2014 | Hagersten | G06F 12/0862 711/119 |
| 2014/0281352 A1* | 9/2014 | Venkatsubramanian | G06F 12/1027 711/205 |

FOREIGN PATENT DOCUMENTS

| | | |
|---|---|---|
| KR | 10-2008-0073822 A | 8/2008 |
| KR | 10-2010-0005539 A | 1/2010 |

OTHER PUBLICATIONS

International Search Report dated Aug. 13, 2014 in counterpart International Application No. PCT/KR2014/003955 (5 pages, with English translation).

* cited by examiner

```
if (inst is memory load/store instruction)
    begin
 addr_t mem_addr = DecodeAddr(inst);
 tracer<-RecodeAddr(mem_addr)
 end
```

FIG. 3B

```
enum { RANDOM = 0, LINEAR, STRIDED, STRIDED_IN_CHUNK };
int size, stride;
int memory_pattern = RANDOM;

compute diff[i] = tracer->GetMemAddr(i+1) - tracer->GetMemAddr(i) for i < tracer->GetNumAddr()-1;
// tracer->GetNumAddr() returns the number of memory accessed by the program
// tracer->GetMemAddr(int i) returns the ith memory location if (all the diff[i] is constant) begin
    if (diff[0] is WORD_SIZE/BYTE_SIZE) begin
        size =1; stride = 1; memory_pattern = LINEAR;
    end
    else begin
        size =1; stride = diff[0]/(WORD_SIZE/BYTE_SIZE); memory_pattern = STRIDED;
    end
end if (first n elements of diff are same, diff[0] is WORD_SIZE/BYTE_SIZE and the pattern repeats) begin
    size = n; stride = diff[n+1]/(WORD_SIZE/BYTE_SIZE);
end
```

FIG. 4A

| a[0] | a[1] | a[2] | a[3] | ... | ... | ... |
|------|------|------|------|-----|-----|-----|
| b[0] | b[1] | b[2] | b[3] | ... | ... | ... |
| c[0] | c[1] | c[2] | c[3] |     |     |     |
|      |      |      |      |     |     |     |
|      |      |      |      |     |     |     |
|      |      |      |      |     |     |     |
|      |      |      |      |     |     |     |

FIG. 4B

| abc[0].a | abc[0].b | abc[0].c | abc[1].a | abc[1].b | abc[1].c | abc[2].a |
|---|---|---|---|---|---|---|
| abc[2].b | abc[2].c | abc[3].a | abc[3].b | abc[3].c | | |
| | | | | | | |
| | | | | | | |
| | | | | | | |
| | | | | | | |
| | | | | | | |

FIG. 5

```
    Add R[0] R[1] R[2]
        map STRIDED 1 720 3 R[16]  // ID:1, offset:720, size:3, R[16]:pc
bb0 : mul R[2] R[0] R[1]
    ld  R[3] mem[R[7]]
    ld  R[4] mem[R[8]]
    ld  R[5] mem[R[9]]
    ………..
    map PREFETCH 1 // ID:1
    …………..
    ble bb0
    map Free_HISTORY 1
```

FIG. 6

CACHE CONTROL DEVICE FOR PREFETCHING USING PATTERN ANALYSIS PROCESSOR AND PREFETCH INSTRUCTION AND PREFETCHING METHOD USING CACHE CONTROL DEVICE

CROSS-REFERENCE TO RELATED APPLICATION(S)

This application is a U.S. continuation bypass national stage application of International Application No. PCT/KR2014/003955, which claims the benefit of Korean Patent Application No. 10-2013-0050250 filed on May 3, 2013, in the Korean Intellectual Property Office, the entire disclosures of which are incorporated herein by reference for all purposes.

BACKGROUND

1. Field

The following description relates to a cache control device for cache prefetching and a prefetching method using the cache control device.

2. Description of Related Art

In general, in computer architecture, a memory fetch instruction is a major hindrance to high-speed processing of a processor because it takes several hundreds to thousands of cycles to process the memory fetch instruction.

To overcome such problems, a cache, which is a high-speed buffer memory, is provided between memory and a processor. By storing accessed data or instruction, and thereby reducing a number of accesses to memory, a cache provides support to a processor for high-speed processing. Even with a small memory capacity, a cache can provide a faster access mechanism, compared to a memory. However, the use of a large cache may be limited by a processor's size, power, and cost.

For efficient use of a cache with a small capacity, latency due to a cache miss is minimized by increasing a probability of finding data or instructions, which are needed by a processor to process a program, in the cache.

That is, a goal may be to maximize a hit ratio of a cache. To this end, prefetching is employed in a cache. A processor is enabled to process a program without latency by predicting data or instructions, and prefetching the data or instructions into the cache.

For prefetching, a memory address locality technique may be used. The locality technique may be classified into temporal locality and spatial locality. Temporal locality refers to consecutive use of the same data within a given period of time, and spatial locality refers to the use of a data address that is close to the currently used data address in memory. However, even if data has low spatial locality or temporal locality, a delay may still occur.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The present examples provide a cache control device configured to perform prefetching by analyzing a memory access pattern, encoding the analyzed memory access pattern to an instruction and creating a prediction table, and a prefetching method using the cache control device.

In one general aspect, a cache control device includes a pattern analysis processor configured to analyze a memory access pattern of program code, a code conversion processor configured to generate a prefetch instruction by encoding the analyzed memory access pattern, and to insert the generated prefetch instruction into the program code, and a prefetch processor configured to prefetch data into a cache in response to an execution of the prefetch instruction inserted into the program code.

The cache control device may further include an optimization processor configured to change a plurality of data to be simultaneously used together into a single array structure, such that the plurality of data is all prefetched together into the cache in response to the execution of the prefetch instruction inserted into the program code.

The cache control device may further include a prefetch table configured to store input parameters of the prefetch instruction, wherein the prefetch processor executes the prefetch instruction inserted into the program code, based on the input parameters.

The prefetch processor may prefetch data according to a regular pattern, in response to the execution of the prefetch instruction inserted into the program code.

The pattern analysis processor may compile the program code into binary code, and analyze the memory access pattern by profiling the binary code.

The prefetch instruction may include, as the input parameters, at least one identifier (ID) for identifying a memory access pattern of the program code, a program counter (PC) to determine a data fetching time, a memory address of data to be fetched, and a number of data blocks to be fetched.

In a case in which the prefetch instruction in the program code comprises, as an input parameter, an offset value between a base memory address and a memory address of data to be fetched, the prefetch processor may obtain the memory address of the data to be fetched by adding the offset value to the base memory address.

The prefetch processor may obtain the base memory address by monitoring a data bus.

The prefetch instruction in the program code may be executed using an empty slot of a very long instruction word (VLIW).

In another general aspect, a prefetch method includes analyzing a memory access pattern of program code, generating a prefetch instruction by encoding the analyzed memory access pattern, inserting the generated prefetch instruction into the program code, and prefetching data into a cache in response to an execution of the prefetch instruction that is inserted into the program code.

The prefetch method may further include changing into a single array structure a plurality of data to be simultaneously used such that the plurality of data is all prefetched together into the cache in response to the execution of the prefetch instruction inserted into the program code.

The generating of the prefetch instruction may include generating a prefetch table storing input parameters of the prefetch instruction, and the prefetching of the data comprises executing the prefetch instruction inserted into the program code based on the input parameters.

The prefetching of the data into the cache may include prefetching the data according to a regular pattern in response to the execution of the prefetch instruction inserted into the program code.

The analyzing of the memory access pattern may include compiling the program code into binary code and analyzing the memory access pattern by profiling the binary code.

In a case in which the prefetch instruction in the program code include, as an input parameter, an offset value between a base memory address and a memory address of data to be fetched, the prefetching of the data into the cache comprises determining the memory address of the data to be prefetched by adding the offset value to the base memory address.

The prefetching of the data into the cache may include obtaining the base memory address by monitoring a data bus.

The prefetching of the data into the cache may include determining a time at which to prefetch the data by monitoring a program counter.

In another general aspect, a cache control device includes a code conversion processor configured to generate a prefetch instruction by encoding an analyzed memory access pattern of program code, and to insert the generated prefetch instruction into the program code, and a prefetch processor configured to prefetch data into a cache in response to an execution of the prefetch instruction inserted into the program code.

The cache control device may further include an optimization processor configured to change a plurality of data to be simultaneously used together into a single array structure, such that the plurality of data is all prefetched together into the cache in response to the execution of the prefetch instruction inserted into the program code.

The cache control device may further include a prefetch table configured to store input parameters of the prefetch instruction, wherein the prefetch processor executes the prefetch instruction inserted into the program code, based on the input parameters.

As described above, it is possible to provide effective use of a cache through cache prefetching, and to reduce delay due to a cache miss.

In addition, because a memory access pattern is analyzed, and the analyzed memory access pattern is encoded into an instruction with several input parameters, the cache control device has advantages in terms of the number of instruction lines used for prefetching, and an amount of hardware resources used.

Further, prefetching is performed differently for a different memory access pattern, so that prefetching can be carried out for any type of memory access pattern, and the memory is reconfigured to enable a plurality of data to be loaded all together in one approach, thereby maximizing prefetching efficiency.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Hereinafter, examples are described fully with reference to the accompanying drawings. Terms described below are selected by considering functions in the examples and meanings potentially vary depending on, for example, a user or operator's intentions or customs. Therefore, in the following examples, when terms are specifically defined, the meanings of terms are to be interpreted based on the definitions, and otherwise, are to be interpreted based on general meanings recognized by those skilled in the art.

In addition, although configurations of selectively described aspects or selectively described examples as below are illustrated as a single integrated configuration in the drawings, unless otherwise described, it is to be understood that these examples are potentially freely combined with each other when technological contradiction of these combinations is not apparent to those skilled in the art.

Figure 1:
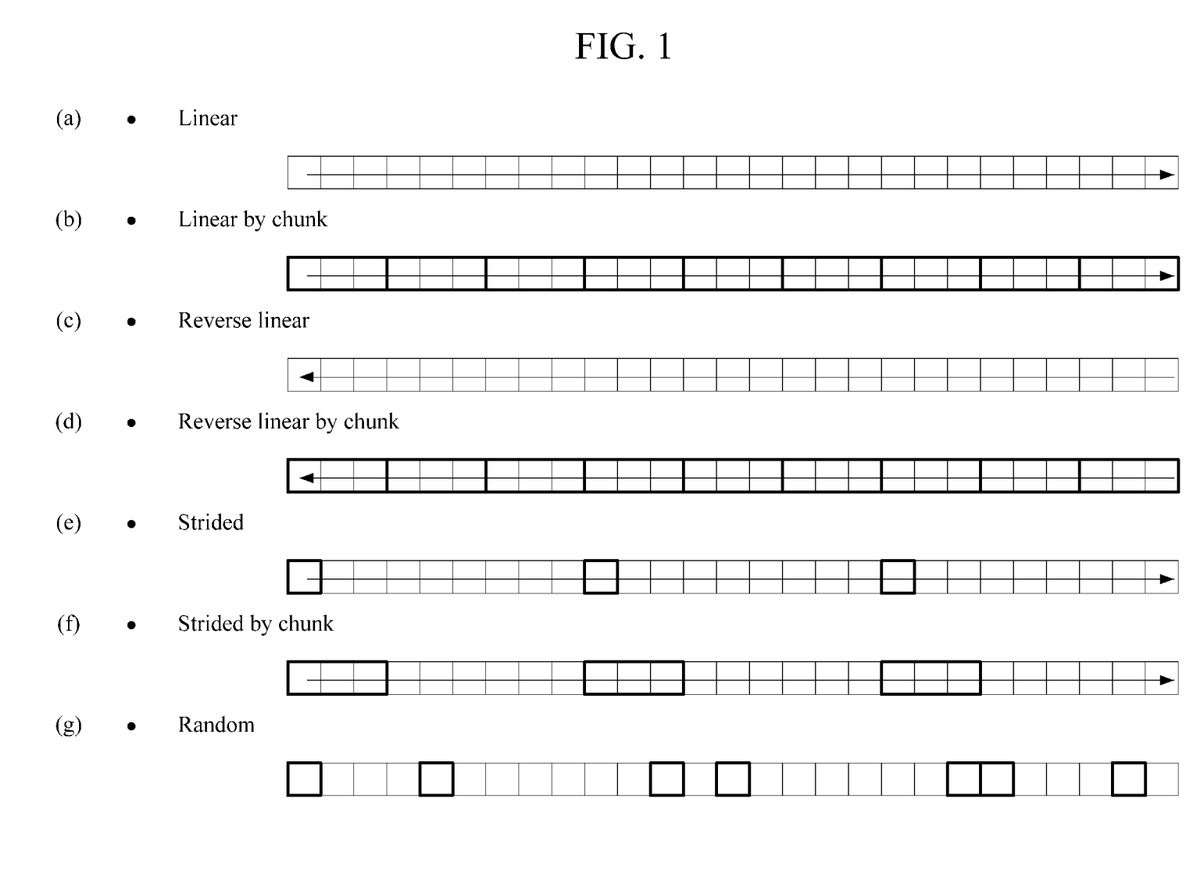
FIG. 1 is a diagram illustrating various memory access patterns of program code.

FIG. 1 is a diagram illustrating various memory access patterns of program code.

Referring to the example of FIG. 1, data required for execution of program code is stored in memory in various structures. The data storage structure determines a memory access pattern of program code.

For example, in a case where, as shown in (a) and (c) of FIG. 1, data required for execution of program code are sequentially input in units of one memory block, and the program code has a linear memory access pattern. In addition, in a case where, as shown in (b) and (d) of FIG. 1, data required for execution of program code are sequentially input in units of several memory blocks, the program code has a linear-by-chunk memory access pattern.

In addition, as shown in (e) of FIG. 1, where data required for execution of program code are input sequentially in units of one memory block and at particular intervals, the program code has a strided memory access pattern. Moreover, in a case where, as shown in (f) of FIG. 1, data required for execution of program code are input sequentially in units of several memory blocks and at particular intervals, the program code has a strided-by-chunk memory access pattern.

Further, as shown in (g) of FIG. 1, data required for execution of program code are arranged randomly.

Figure 2:
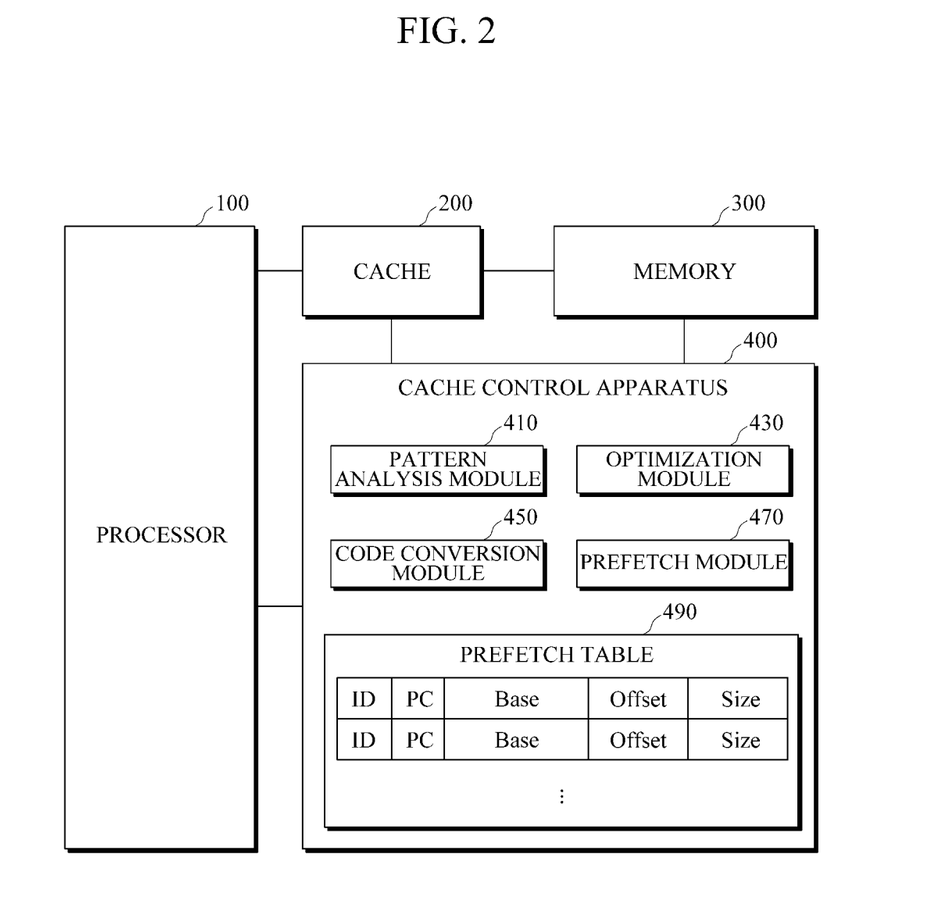
FIG. 2 is a block diagram illustrating an example of a cache control device.

FIG. 2 is a block diagram illustrating an example of a cache control device.

Cache control device 400 analyzes a memory access pattern of a program, generates a prefetch instruction that is encoded based on the analyzed memory access pattern, with reference to the example of FIG. 1, and prefetches data into a cache 200 in response to the generated prefetch instruction, so that a processor 100 processes program code without delay.

Referring to FIG. 2, the cache control device 400 includes a pattern analysis module 410, an optimization module 430, a code conversion module 450, a prefetch module 470, and a prefetch table 490.

The pattern analysis module 410 analyzes a regular memory access pattern of program code. More specifically, the pattern analysis module 410 compiles the program code into binary code, and analyzes the memory access pattern by profiling the binary code. "Profiling" is one type of dynamic program analysis, enabling program code instrumentation and program code analysis through a simulation.

The optimization module 430 changes a structure of data stored in the memory 300 so that a plurality of dispersed data stored in the memory 300 are all prefetched together at once in response to execution of a single prefetch instruction. In a case where a plurality of data is used to execute program code, if the plurality of data is dispersed throughout the memory 300, the prefetch module 470 needs to execute a prefetch instruction several times to prefetch each data. To reduce overhead due to prefetching, the optimization module 430 changes a structure of data stored in the memory so as to enable a plurality of data, which is to be simultaneously used, to be prefetched by executing a prefetch instruction only once. For example, the optimization module 430 changes to a single structure the plurality of data to be simultaneously used, such that the plurality of data is able to all be prefetched together at once in response to the execution of a single prefetch instruction. In addition, the optimization module 430 uses the resulting structure to modify the program code to be executable. In addition, the optimization module 430 determines whether to execute a prefetch instruction several times, based on information about the memory access pattern analyzed by the pattern analysis module 410.

The code conversion module 450 changes the program code based on a prefetch instruction that is generated by encoding the analyzed memory access pattern. More specifically, the code conversion module 450 inserts the prefetch instruction into the program code. In this case, a plurality of data is all prefetched together at once according to the regular pattern, in response to the execution of the prefetch instruction. For example, the prefetch instruction includes various data, such as identifiers (IDs) for identifying various memory access patterns, a program counter (PC) used for determining a data fetching time at which to fetch data, a memory address of data to be fetched, the number of fetched data blocks, and the like, as input parameters.

In addition, the code conversion module 450 stores an input parameter needed for executing the prefetch instruction in the prefetch table 490.

In response to the execution of the prefetch instruction inserted into the program code, the prefetch module 470 prefetches data into the cache 200. Based on a monitored PC value, the prefetch module 470 determines a time at which to prefetch the data. In addition, the prefetch module 470 prefetches data according to a regular pattern, in response to a prefetch instruction. In this case, the prefetch module 470 monitors the PC for periodically prefetching data.

The prefetch module 470 prefetches data by executing a prefetch instruction based on input parameters present in the prefetch table 490. In addition, if a memory address stored in the prefetch table 490 is represented as an offset value from a base memory address, the prefetch module 470 obtains the memory address by adding the stored offset value to the base memory address. The base memory address is a memory address obtained from data bus monitoring, or a memory address of the latest output data. The prefetch module 470 enables data prefetching by means of a prefetch instruction that contains a base memory address and the offset value as parameters, where the memory address is represented as the offset value from a base memory address, thereby reducing overhead for prefetching.

The prefetch table 490 receives various factors used as input parameters of the prefetch instruction from the code conversion module 450, stores received factors, and provides the stored input parameters to the prefetch module 470. More specifically, the prefetch table 490 contains identifiers for identifying various memory access patterns, a program counter for determining the time at which to fetch data, a memory address of data to be fetched, a size of data block to be fetched, and other similar information.

The memory address stored in the prefetch table 490 is, for example, a physical memory address, or an offset value between a base memory address and a memory address at which data is present. Here, in an example, the base memory address is a specific memory address, such as the latest output memory address or a memory address of data currently transmitted through a data bus.

For convenience of description, FIG. 2 illustrates that the cache control device 400 is placed separately from the processor 100; however, the cache control device 400 and the processor 100 are potentially equipped in a single chip, or some elements in the processor 100 potentially operates as the cache control device 400. In addition, the memory 300 is not limited to a general memory, and is optionally a layer 2 (L2) cache.

Herein, each element of the cache control device is described in further detail.

Figure 3A:
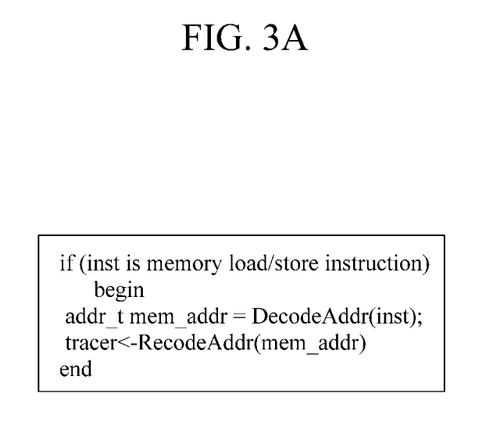
FIGS. 3A-3B illustrate diagrams showing source codes for explaining an example analysis of memory access patterns by a pattern analysis module.
Figure 3B:
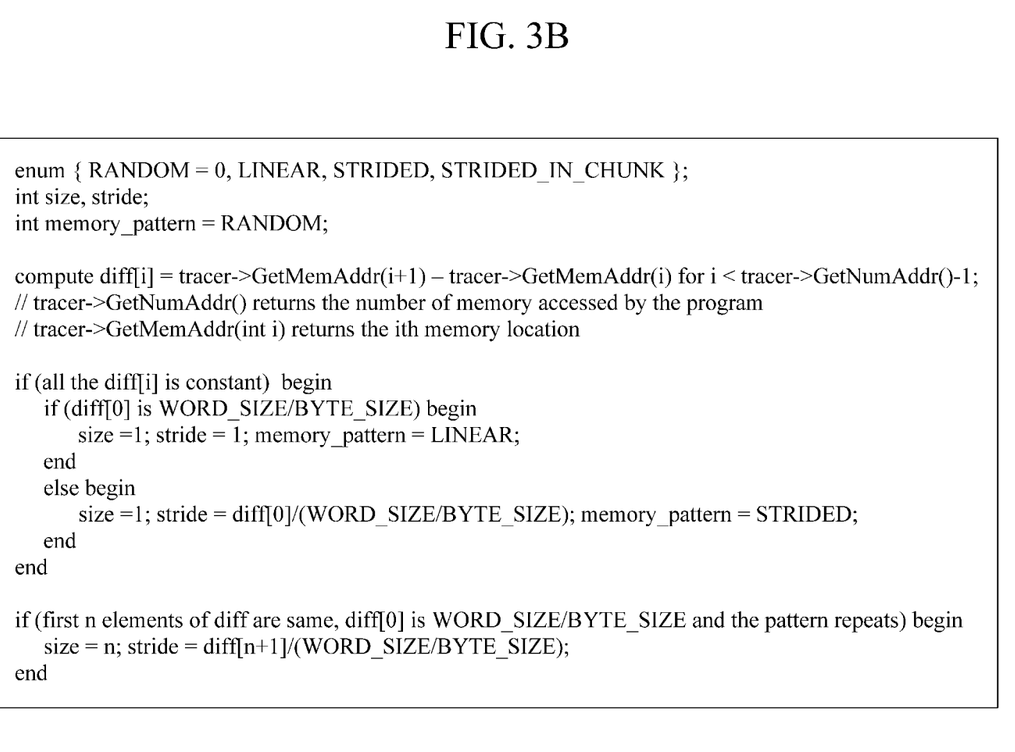

FIGS. 3A-3B shows source codes for explaining an example analysis of memory access patterns by a pattern analysis module.

Referring back to FIG. 2, program code has various memory access patterns according to data storage structures, with reference to FIG. 1. The analysis of memory access patterns is performed by the pattern analysis module 410.

FIG. 3A illustrates source code to store memory access information by a program in a tracer. For example, the pattern analysis module 410 stores the memory access information in a tracer by executing the source code shown in FIG. 3A. The memory access information refers to not only a memory address to be accessed for program execution, but also the information required for memory access patterns, such as information about a memory fetching time, the number of memory fields used to store a datum, that is, a size of each datum, and other similar information.

FIG. 3B illustrates source code to analyze a memory access pattern based on the memory access information stored in a tracer. The pattern analysis module 410 analyzes a memory access pattern based on the tracer generated by executing the source code of FIG. 3A. More specifically, the pattern analysis module 410 traverses a plurality of pieces of memory access information stored in variables, and calculates an interval using the function tracer→GetMemAddr (int i) between memory fields storing each datum. Then, the pattern analysis module 410 analyzes the memory access pattern based on the calculated memory field intervals and the number of memory fields taken by each datum, that is, data sizes.

Referring back to FIG. 1, when the calculated memory field interval is 1, and each datum is stored in one memory field, the pattern analysis module 410 determines that the memory access pattern is a linear pattern. Alternatively, when the calculated memory field interval is 3, and each datum occupies three memory fields, the pattern analysis module 410 determines that the memory access pattern is a linear by chunk pattern. In another example, when the calculated memory field interval is 5, and each data occupies only one memory field, the pattern analysis module 410 determines that the memory access pattern is a strided pattern.

The source codes shown in FIGS. 3A-3B are examples for analysis of a memory access pattern, and aspects of the description are not limited thereto, and other appropriate alternatives may be used.

Figure 4A:
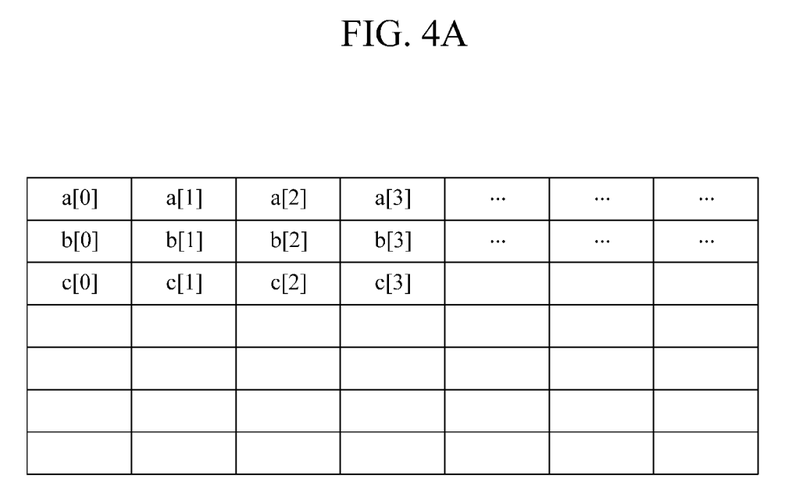
FIGS. 4A-4B illustrate diagrams of data structures to explain change of a data structure by an optimization module.
Figure 4B:
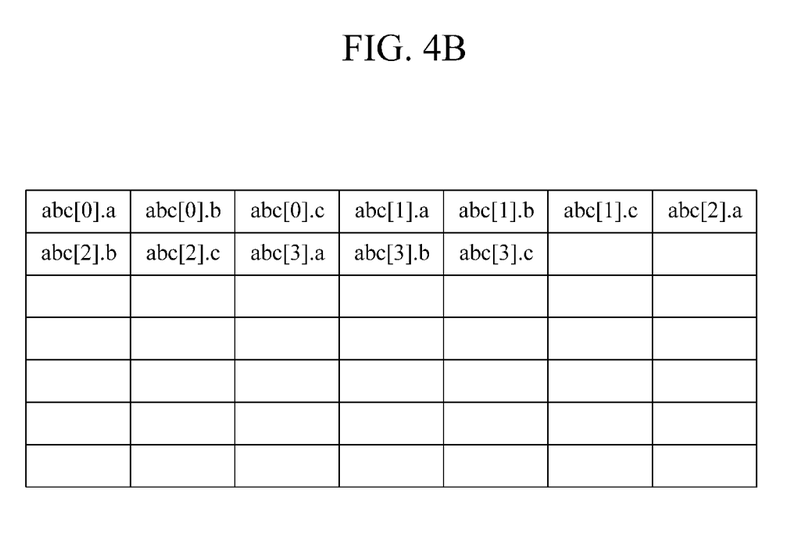

FIGS. 4A-4B illustrate data structures to explain a method for changing a data structure by using an optimization module.

FIG. 4A illustrates a data structure stored in a memory before being changed by an optimization module. FIG. 4B illustrates a data structure stored in a memory after being changed by the optimization module.

TABLE 1

```
int a[NUM_DATA];
int b[NUM_DATA];
int c[NUM_DATA];
int d[NUM_DATA];
For(i = 0; i<1000; ++i){
   .........
   d[i] = add(a[i], b[i], c[i]);
   .........
}
```

Table 1 shows program code before the program code is changed by the optimization module.

Referring to Table 1, and FIGS. 1 and 4A, the cache control device prefetches three data a[i], b[i], and c[i] for each add operation. That is, the cache control device executes a prefetch instruction three times at each loop in order to prefetch necessary data dispersed in the memory. To reduce such overhead, the optimization module 430 changes both a structure of the data stored in the memory and the program code such that a plurality of data to be simultaneously used can be prefetched by executing a prefetch instruction only once for the plurality.

TABLE 2

```
struck{
   int a;
   int b;
   int c;
} ABC;
ABC abc[NUM_DATA];
For(i = 0; i<1000; ++i){
   .........
   d[i] = add(abc[i].a, abc[i].b, abc[i].c);
   .........
}
```

Table 2 shows program code after being changed by the optimization module.

Referring to Table 2 and FIG. 4B, the optimization module 430 changes a data structure and program code such that a plurality of data to be simultaneously used are prefetched by executing a prefetch instruction only once. For example, the optimization module 430 changes separate structures of three data a[i], b[i], and c[i] into a single array structure. That is, the optimization module 430 integrates a plurality of data to be simultaneously used together into a single array structure. For example, the optimization module 430 changes data a[0], b[0], and c[0] in the first loop into a single array structure, for example, ABC[0]. Accordingly, the cache control device is able to prefetch the single structure ABC[i] by executing a prefetch instruction only once. A plurality of data to be simultaneously used together is all prefetched together by executing a prefetch instruction only one time. In addition, in an example, the optimization module 430 modifies program code as shown in Table 2 by reflecting the changed data storage structure.

Figure 5:
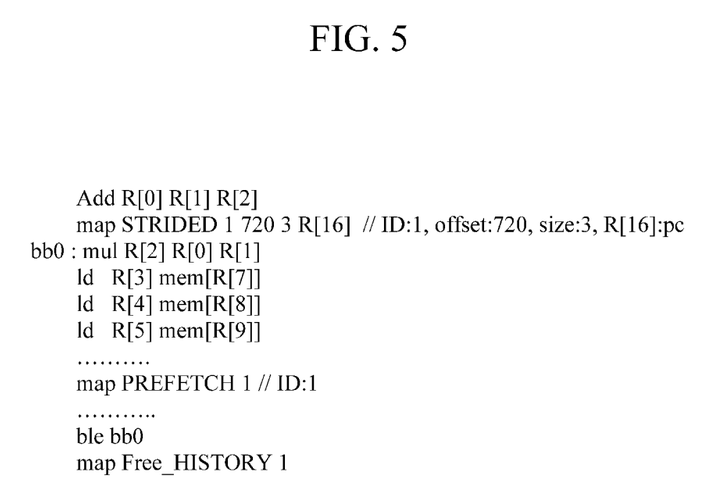
FIG. 5 is a diagram illustrating source code to explain an example of change of program code by a code conversion module.

FIG. 5 illustrates source code to explain an example method for changing program code by a code conversion module.

Referring to the examples of FIGS. 2 and 5, the code conversion module 450 generates a prefetch instruction according to an analyzed memory access pattern, and converts program code in response to the generated prefetch instruction. For example, referring to the example of FIG. 5, the prefetch instruction, map, includes an identifier (ID:1), an offset (offset:720) between data stored in memory, the number (size:3) of memory blocks used for storing one data, and a program counter (R[16]) to determine the data fetching time, as input parameters.

Referring back to FIG. 2, the prefetch module 470 prefetches data into the cache 200 in response to the execution of the prefetch instruction generated by the code conversion module 450. In addition, if the analysis of a memory access pattern indicates that the program code has a periodic memory access pattern, the prefetch module 470 prefetches necessary data all together according to the regular pattern, by executing a prefetch instruction only once. As such, the code conversion module 450 allows for prefetching of data used for executing program code based on only some parameters. Consequently, software and hardware overheads for prefetching are reduced.

Referring to FIGS. 2 and 5, in response to the execution of the prefetch instruction (map STRIDED 1 720 3 R[16]), the prefetch module 470 prefetches three memory fields (size) located at an offset of 720 from the base memory address into the cache 200 when a program counter reaches 16. In this case, the prefetch module 470 obtains the base memory address by monitoring a data bus.

Given that identifier 1 indicates the access pattern as shown in (f) of FIG. 1, the prefetch instruction prefetches three memory fields located at an offset of 720 from the base memory address into the cache 200 each time the program counter reaches 16. That is, in a case where a memory access pattern is periodic, the prefetch module 470 prefetches data according to the periodic memory access pattern by executing a prefetch instruction only once.

Figure 6:
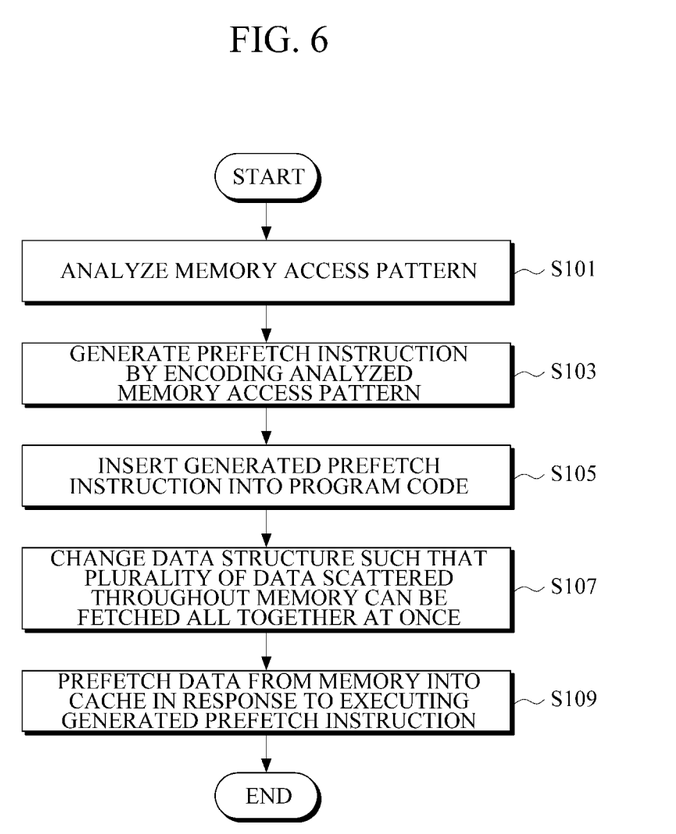
FIG. 6 is a flowchart illustrating an example of a prefetching method.

FIG. 6 is a flowchart illustrating an example of a prefetching method.

Referring to FIG. 6, in S101, a cache control device analyzes a memory access pattern of program code. The cache control device compiles the program code into binary code, and analyzes the memory access pattern by profiling the binary code. For example, multimedia files, such as music, videos, and images, are generally stored as a regular structure. Thus, program code to execute a multimedia file has a regular memory access pattern. The regular memory access pattern is analyzed by executing source code as shown in FIGS. 3A-3B.

Thereafter, in S103, the cache control device generates a prefetch instruction, according to the analyzed memory access pattern. More specifically, the cache control device encodes the analyzed memory access pattern to generate the prefetch instruction. In the case of a regular memory access pattern, the prefetch instruction is encoded to enable data necessary for executing program code to be prefetched based on a few input parameters. For example, referring to FIG. 5, the prefetch instruction map includes an identifier, an offset between data stored in the memory, the number of memory blocks used to store one datum, and a program counter to determine the data fetching time, as input parameters.

In S103, the cache control device also potentially generates a prefetch table that stores various input parameters necessary for executing a prefetch instruction, not shown. For example, the prefetch table stores information, such as an identifier (IDs) for identifying a different memory access pattern, a program counter (PCs) to determine the data fetching time, a memory address of data to be fetched, and the number of data blocks to be fetched (data size), with reference to 490 in FIG. 2.

In S105, the cache control device inserts the prefetch instruction generated in S105 into program code. The prefetch instruction is inserted at a predetermined portion of the program code. At this time, the prefetch instruction is inserted on a line or position that enables the data necessary for program code to be prefetched into cache upon the execution of the program code.

Then, in S107, the cache control device changes data structures, such that a plurality of data dispersed throughout the memory is all fetched together at once. To process the program code, a plurality of data is used. The cache control device is able to prefetch only one datum by executing a prefetch instruction once. Hence, in a case where a plurality of data is stored in the memory from place to place, the cache control device executes a prefetch instruction several times. Therefore, to improve prefetching efficiency, the cache control device changes the data structure stored in the memory. A plurality of data to be simultaneously used is changed into one data structure, and the data structure is stored in an adjacent memory cell, so that the cache control device is able to prefetch the plurality of data to all be simultaneously used together by executing a prefetch instruction only once. In this case, the cache control device changes the program code by reflecting a changed data storage structure. For example, as shown in FIG. 4B, data stored in the memory are changed to a single array structure, and an input parameter of the program code is changed to a format that references structures ABC[i].a, ABC[i].b, and ABC[i].c. In addition, the cache control device uses the memory access pattern, which is analyzed in S101, to determine a structure of data required for executing the program code, and whether to simultaneously access the memory. Although FIG. 6 illustrates operation S107 as being performed subsequent to operation S103, the order of operations is optionally changed or is performed simultaneously in other examples.

In S109, the cache control device prefetches data stored in the memory in response to the execution of the prefetch instruction inserted in the program code. For example, the cache control device prefetches data according to a regular pattern by executing a prefetching instruction only once. In so doing, the cache control device monitors a data bus, a program counter, and the like, and uses the monitoring result as information for prefetching. Further, the cache control device executes the prefetch instruction inserted into the program code, based on the input parameters stored in the prefetch table.

For example, if the prefetch instruction in the program code includes, as input parameters, a base memory address and an offset between data to be fetched, an additional operation of obtaining a memory address of data to be prefetched by adding the base memory address and the offset value, not shown, is further included in the flow. Here, in examples, the base memory address is a memory address obtained from data bus monitoring, or a memory address of the latest fetched data. It is to be understood that, in examples, the base memory address is obtained by monitoring a data bus or by separately managing a memory address of the latest fetched data.

The apparatuses, units, modules, devices, and other components illustrated in FIGS. 1-6 that perform the operations described herein with respect to FIGS. 1-6 are implemented by hardware components. Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1-6. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-6 that perform the operations described herein with respect to FIGS. 1-6 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A cache control device comprising:
a pattern analysis processor configured to analyze a memory access pattern of program code;
a code conversion processor configured to generate a prefetch instruction by encoding the analyzed memory access pattern, and to insert the generated prefetch instruction into the program code;
a prefetch processor configured to prefetch data into a cache, in response to an execution of the prefetch instruction inserted into the program code; and
an optimization processor configured to change a plurality of data to be simultaneously used together into a single array structure, such that the plurality of data are all prefetched together into the cache.

2. The cache control device of claim 1, further comprising:
a prefetch table configured to store input parameters of the prefetch instruction,
wherein the prefetch processor executes the prefetch instruction inserted into the program code, based on the input parameters.

3. The cache control device of claim 1, wherein the prefetch processor prefetches data according to a regular pattern, in response to the execution of the prefetch instruction inserted into the program code.

4. The cache control device of claim 1, wherein the pattern analysis processor compiles the program code into binary code, and analyzes the memory access pattern by profiling the binary code.

5. The cache control device of claim 1, wherein the prefetch instruction comprises, as the input parameters, at least one identifier (ID) for identifying a memory access pattern of the program code, a program counter (PC) to determine a data fetching time, a memory address of data to be fetched, and a number of data blocks to be fetched.

6. The cache control device of claim 1, wherein in a case in which the prefetch instruction in the program code comprises, as an input parameter, an offset value between a base memory address and a memory address of data to be fetched, the prefetch processor obtains the memory address of the data to be fetched by adding the offset value to the base memory address.

7. The cache control device of claim 6, wherein the prefetch processor obtains the base memory address by monitoring a data bus.

8. The cache control device of claim 1, wherein the prefetch instruction in the program code is executed using an empty slot of a very long instruction word (VLIW).

9. A prefetch method comprising:
analyzing a memory access pattern of program code;
generating a prefetch instruction by encoding the analyzed memory access pattern;
inserting the generated prefetch instruction into the program code;
prefetching data into a cache, in response to an execution of the prefetch instruction that is inserted into the program code; and
changing into a single array structure a plurality of data to be simultaneously used such that the plurality of data are all prefetched together into the cache.

10. The prefetch method of claim 9, wherein the generating of the prefetch instruction comprises generating a prefetch table storing input parameters of the prefetch instruction, and the prefetching of the data comprises executing the prefetch instruction inserted into the program code based on the input parameters.

11. The prefetch method of claim 9, wherein the prefetching of the data into the cache comprises prefetching the data according to a regular pattern in response to the execution of the prefetch instruction inserted into the program code.

12. The prefetch method of claim 9, wherein the analyzing of the memory access pattern comprises compiling the program code into binary code and analyzing the memory access pattern by profiling the binary code.

13. The prefetch method of claim 9, wherein, in a case in which the prefetch instruction in the program code comprises, as an input parameter, an offset value between a base memory address and a memory address of data to be fetched, the prefetching of the data into the cache comprises determining the memory address of the data to be prefetched by adding the offset value to the base memory address.

14. The prefetch method of claim 13, wherein the prefetching of the data into the cache comprises obtaining the base memory address by monitoring a data bus.

15. The prefetch method of claim 9, wherein the prefetching of the data into the cache comprises determining a time at which to prefetch the data by monitoring a program counter.

16. A cache control device comprising:
   a code conversion processor configured to generate a prefetch instruction by encoding an analyzed memory access pattern of program code, and to insert the generated prefetch instruction into the program code;
   a prefetch processor configured to prefetch data into a cache, in response to an execution of the prefetch instruction inserted into the program code; and
   an optimization processor configured to change a plurality of data to be simultaneously used together into a single array structure, such that the plurality of data are all prefetched together into the cache.

17. The cache control device of claim 16, further comprising:
   a prefetch table configured to store input parameters of the prefetch instruction,
   wherein the prefetch processor executes the prefetch instruction inserted into the program code, based on the input parameters.

* * * * *